S. W. & J. F. Palmer,
Machine Gearing,
N° 54,589. Patented May 8, 1866.

Witnesses;
J. W. B. Covington
Wm. Treurn

Inventor;
S. W. Palmer
J. F. Palmer
Per Munn & Co
Attorneys

UNITED STATES PATENT OFFICE.

S. W. PALMER AND J. F. PALMER, OF AUBURN, NEW YORK.

IMPROVEMENT IN GEARING.

Specification forming part of Letters Patent No. 54,589, dated May 8, 1866.

*To all whom it may concern:*

Be it known that we, S. W. PALMER and J. F. PALMER, of Auburn, Cayuga county, State of New York, have invented a new and useful Improvement in Gearing; and we do hereby declare that the following is a full, clear, and exact description thereof, which will enable others skilled in the art to make and use the same, reference being had to the accompanying drawings, forming part of this specification, in which—

Figure 1:
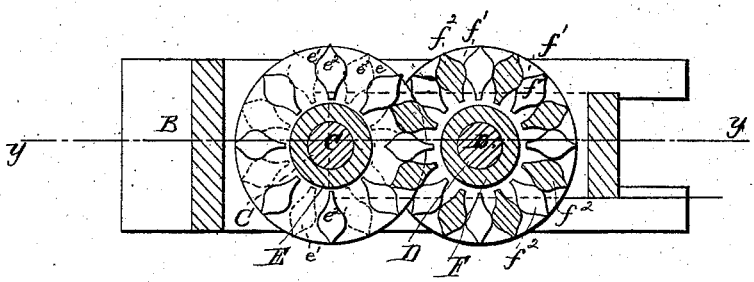
Figure 2:
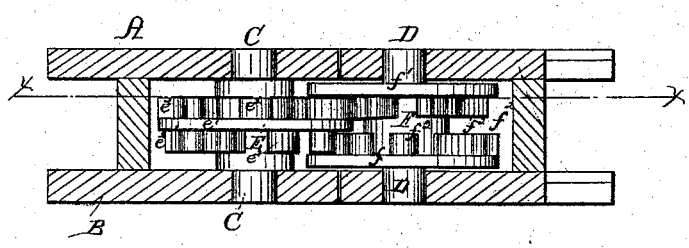

Figure 1 is a section of our improved gearing, taken through the line $x\,x$, Fig. 2. Fig. 2 is a section of the same, taken through the line $y\,y$, Fig. 1.

Similar letters of reference indicate like parts.

Our invention has for its object to furnish a gearing for transmitting motion from one shaft to another when the said shafts operate at varying distances from each other, as is the case with clothes-wringers, planing-machines, &c.; and it consists of wheels, disks, or circular plates having teeth or cogs upon the faces of said disks so arranged that there may be two or more sets of teeth or cogs on each shaft, as hereinafter more fully described.

A and B represent the frame that supports the bearings in which the shafts C and D that carry the gear-wheels E and F revolve. The wheel E bears or is formed of a circular plate, $e'$, having teeth or cogs $e^2$ on each of its faces or disks. The teeth or cogs $e^2$ are so arranged that the distance between the cogs, taken circumferentially, shall be equal. The wheel F bears or is formed of two circular plates, on the inner faces or disks of which are cogs or teeth $f^2$, so arranged that the distance between said cogs or teeth, taken circumferentially, shall be equal.

The shaft C is stationary, but the shaft D is movable, so that it may adjust itself to the different thicknesses of the various articles passing between the said shafts C and D, or between the rollers attached to said shafts, the teeth or cogs $e^2$ and $f^2$ being so formed as to take hold of and operate upon each other at whatever distance apart the shafts C and D may be.

The form of teeth or cogs represented in Fig. 1 is suggested as a very good one, though other forms will answer the purpose.

The movement of the movable shaft D may be controlled and the said shaft or roller kept down to its work by a spring, in the ordinary manner, or by any other well-known device.

We claim as new and desire to secure by Letters Patent—

An improved gearing, consisting of two or more disks or circular plates having teeth or cogs on their faces so constructed and arranged that there may be two or more sets of teeth or cogs on each shaft, to operate in transmitting motion from one shaft to another when said shafts are at a varying distance apart, substantially as herein described, and for the purpose set forth.

S. W. PALMER.
J. F. PALMER.

Witnesses:
 HORACE T. COOK,
 JOHN J. SHEPHERD.